United States Patent

Ernst

[15] 3,681,680
[45] Aug. 1, 1972

[54] RF SPECTROMETER EMPLOYING MODULATION OF A DC MAGNETIC FIELD TO EXCITE RESONANCE

[72] Inventor: Richard R. Ernst, Winterthur, Switzerland

[73] Assignee: Varian Associates, Palo Alto, Calif.

[22] Filed: May 28, 1970

[21] Appl. No.: 41,409

[52] U.S. Cl. .............................................. 324/0.5 R
[51] Int. Cl. .............................................. G01n 27/78
[58] Field of Search ....324/0.5, 58, 58.5; 235/151.35

[56] References Cited

UNITED STATES PATENTS 3,475,680   10/1969   Anderson ....................... 324/0.5
3,147,428   9/1964   Anderson ....................... 324/0.5

Primary Examiner—Michael J. Lynch
Attorney—Stanley Z. Cole and Vincent W. Cleary

[57] ABSTRACT

A radiofrequency spectrometer is disclosed which includes a radiofrequency transmitter for irradiating a sample of matter disposed in a polarizing magnetic field. The intensity of the polarizing magnetic field is modulated in a time varying manner to produce a spectrum of alternating magnetic fields within the sample having a bandwidth wide enough to cover the resonance spectrum of the sample for exciting simultaneous resonance of a spectrum of the sample. A detector picks up the resonance signals emanating from the sample for analysis by a spectrum analyzer to separate the resonance lines of the sample.

6 Claims, 7 Drawing Figures

INVENTOR.
RICHARD R. ERNST
BY
ATTORNEY

RF SPECTROMETER EMPLOYING MODULATION OF A DC MAGNETIC FIELD TO EXCITE RESONANCE

DESCRIPTION OF THE PRIOR ART

Heretofore, radiofrequency spectrometers have employed a pulsed radiofrequency transmitter for applying a train of short bursts of radiofrequency energy to a sample disposed in a polarizing magnetic field to excite resonance of a plurality of resonance lines simultaneously. The composite resonance signal emanating from the sample was picked up by a receiver in the time interval between successive pulses of the pulse train of the transmitter. Such a spectrometer is disclosed and claimed in U.S. Pat. No. 3,475,680 issued Oct. 28, 1969, and assigned to the same assignee as the present invention. While this type of impulse resonance spectrometer greatly reduces the amount of time required for an analysis of a given sample it has the disadvantage that the peak power of the transmitted energy has to be relatively high to achieve wide band excitation of a sample under analysis.

In another RF spectrometer, the transmitter peak power requirements for simultaneously exciting wide band resonance of the sample under analysis are substantially reduced by modulating the transmitted phase of c.w. radiofrequency energy in a pseudorandom sequence. Such a spectrometer is disclosed and claimed in copending U.S. application Ser. No. 847,859 now U.S. Pat. No. 3,581,191 filed Aug. 6, 1969, and assigned to the same assignee as the present invention. While this latter spectrometer has the advantage of substantially reducing the peak power of the transmitter, it raises the problem that radio frequency energy is continuously being applied to the sample and although efforts are made to reduce the amount of RF leakage from the transmitter into the receiver, such leakage occurs and tends to overload the receiver resulting in distortion of the amplified resonance signals, and causes an undesired baseline shift of the final spectrum.

SUMMARY OF THE PRESENT INVENTION

The principal object of the present invention is the provision of an improved RF spectrometer employing modulation of a magnetic field to excite resonance of a sample.

One feature of the present invention is the provision of method and apparatus, in an RF spectrometer, for exciting simultaneous resonance of a plurality of resonance lines of a sample disposed in a polarizing magnetic field wherein the sample is irradiated with radio frequency energy of a frequency displaced from the spectrum of the sample to be excited and wherein the polarizing magnetic field is intensity modulated in a time varying manner to produce a sideband spectrum of alternating magnetic fields within the sample having a bandwidth wide enough to excite simultaneous resonance of the spectrum of the sample under analysis, whereby the irradiating radiofrequency is of a frequency outside of the resonance spectrum of the sample, and, thus, is not directly coupled from the transmitter to the receiver.

Another feature of the present invention is the same as the preceding feature wherein the intensity modulation of the polarizing magnetic field is random or pseudorandom to obtain a noise excited spectrum of the sample under analysis.

Another feature of the present invention is the same any any one or more of the preceding features wherein the intensity of the polarizing magnetic field is pulse modulated with a sequence of pulses having pulse lengths substantially shorter than the average period between successive pulses of the sequence.

Another feature of the present invention is the same as the preceding feature wherein the pulses have an amplitude Hp defined approximately by the relation:

$$\gamma \int_0^\tau H_p dt = \pi$$

where $\gamma$ is the gyromagnetic ratio for the sample, and $\tau$ is the pulse length.

Other features and advantages of the present invention will become apparent upon a perusal of the following specification taken in connection with the accompanying drawings wherein:

DESCRIPTION OF THE PREFERRED EMBODIMENTS

Figures 1, 2, 3, 4:
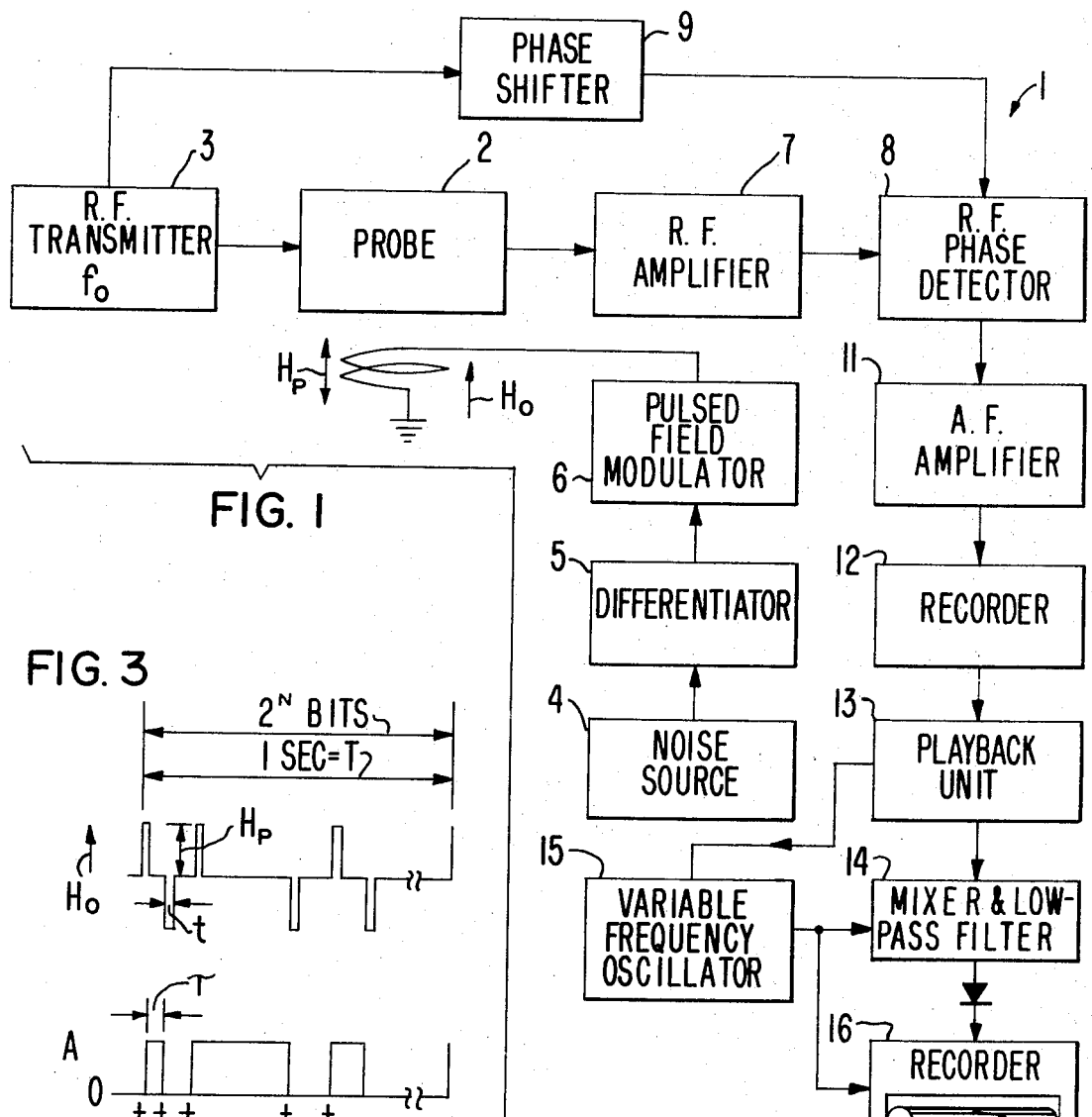
FIG. 1 is a schematic block diagram of a radio frequency spectrometer incorporating features of the present invention.
FIG. 2 is a plot of binary output amplitude A versus time depicting the output waveform of a pseudorandom binary sequence.
FIG. 3 is a plot of polarizing magnetic field intensity $H_o$ versus the same time scale as FIG. 2 and depicting the modulation waveform employed for modulating the intensity of its polarizing magnetic field in the spectrometer of FIG. 1.
FIG. 4 is a plot of radio frequency power versus frequency depicting the equivalent RF power spectrum applied to the sample in the spectrometer in FIG. 1.

Referring now to FIG. 1, there is shown a radio frequency spectrometer 1 incorporating features of the present invention. In the spectrometer, a sample of matter to be investigated, such as a gyromagnetic resonance sample having a plurality of resonance lines to be examined, is disposed within a suitable probe structure 2 and immersed in a polarizing magnetic field derived from a radio frequency transmitter 3 having a frequency $f_o$ disposed at one end of the resonant frequency spectrum of the sample to be excited. The magnetic field energy supplied from the radio frequency transmitter is applied with the magnetic field vector at a right angle to the polarizing magnetic field $H_o$.

The polarizing magnetic field $H_o$ is pulse modulated with a random or pseudorandom time sequence of pulses in a manner to be more fully described below, to produce an equivalent RF power spectrum having a $\left(\frac{\sin x}{x}\right)^2$ envelope as shown in FIG. 4. The random or pseudorandom polarizing magnetic field modulator includes a noise source 4. In the case of a pseudorandom noise source generally the noise source includes a shift register which is preferably connected to produce a maximum length sequence and which is driven by a train of coherent pulses derived from a clock pulse generator within the noise source. The output of the shift register is a binary random sequence containing a certain number N of basic steps of length $\tau$ before the sequence repeats, where $\tau$ is the shortest length step. There are $N=2^n-1$ actual steps in each pseudorandom sequence where n is the number of binaries in the shift register. The output of the shift register is as shown in FIG. 2; the pseudorandom binary sequence generator is of the type disclosed in: U.S. Pat. Nos. 3,581,191 issued Mar. 25, 1971 and 3,588,678 issued June 28, 1971, such patents being assigned to the same assignee as that of the present application.

The output of the noise source 4 is fed to a differentiator 5 which differentiates the binary sequence to derive a train of trigger pulses which are fed to a pulsed field modulator 6 which modulates the polarizing magnetic field $H_o$ with a train of pulses of duration t which are much shorter than the shortest period $\tau$ between successive pulses. The pulse modulation of the polarizing magnetic field $H_o$, in a preferred embodiment, is chosen to have a peak amplitude $H_p$ defined by the following relation:

$$\gamma \int_0^{t'} H_p dt' = \pi$$

where $\gamma$ is the gyromagnetic ratio for the sample and $\tau$ is the pulse length and $dt'$ is a differential with respect to time. When these conditions are satisfied the equivalent RF power spectrum generated within the sample has the $$\left(\frac{\sin x}{x}\right)^2$$

distribution, as shown in FIG. 4, with $x=\pi(f-f_o)t$ and with spectral line spacing $\Delta f=1/T$ where $T$ is the length of the pseudorandom sequence. In a typical example $T$ is one second such that the line separation $\Delta f$ is 1 Hz. The transmitter frequency $f_o$ is placed at one end of the spectrum of the sample to be analyzed such that the equivalent RF power spectrum applied to the sample excites simultaneous resonance of all the lines within the sample.

The resonance spectrum emanating from the sample is picked up by a suitable receiver circuit within the probe 2 and fed to the input of a radiofrequency amplifier 7 where it is amplified and thence fed to one input of a radio frequency phase sensitive detector 8 where it is mixed with a sample of the radio frequency transmitter signal $f_o$ to obtain a composite audio frequency resonance signal containing the simultaneous resonance lines of the sample under analysis. The phase of the radio frequency transmitter signal as fed to the input of detector 8 is controlled by means of a phase shifter 9.

The composite audio frequency resonance signal is fed from the RF detector 8 to the input of an audio frequency amplifier 11 wherein it is amplified and fed to the input of a magnetic recorder 12. The composite resonance signal is recorded as a function of time by the recorder 12 on a recording medium such as a tape or magnetic disc. The recording is frequency analyzed to separate the Fourier resonance line signals of the sample under analysis by repeatedly playing back the recording into the input of a mixer 14 and heterodyning the playback signal with the output of a variable frequency oscillator 15 which is set at a certain frequency for the entire playback of the recording; next the oscillator 15 is then advanced to a new frequency corresponding to the desired resolution and having a frequency separation from the previous setting by no less than $\Delta f$ where $\Delta f$ is the line spacing of the spectral density of the exciting energy applied to the sample. When the frequency of the variable frequency oscillator corresponds to a resonance signal a DC output is obtained which is fed through a low pass filter and rectifier to a recorder 16 for recording as a function of the frequency of the variable frequency oscillator 15 to derive an output power spectrum of the sample under analysis. The use of the playback unit 13, variable oscillator 15 and mixer 14 to obtain a power output spectrum is disclosed in U.S. Pat. No. 3,287,629 issued Nov. 22, 966 and assigned to the same assignee as the present invention.

Figure 5:
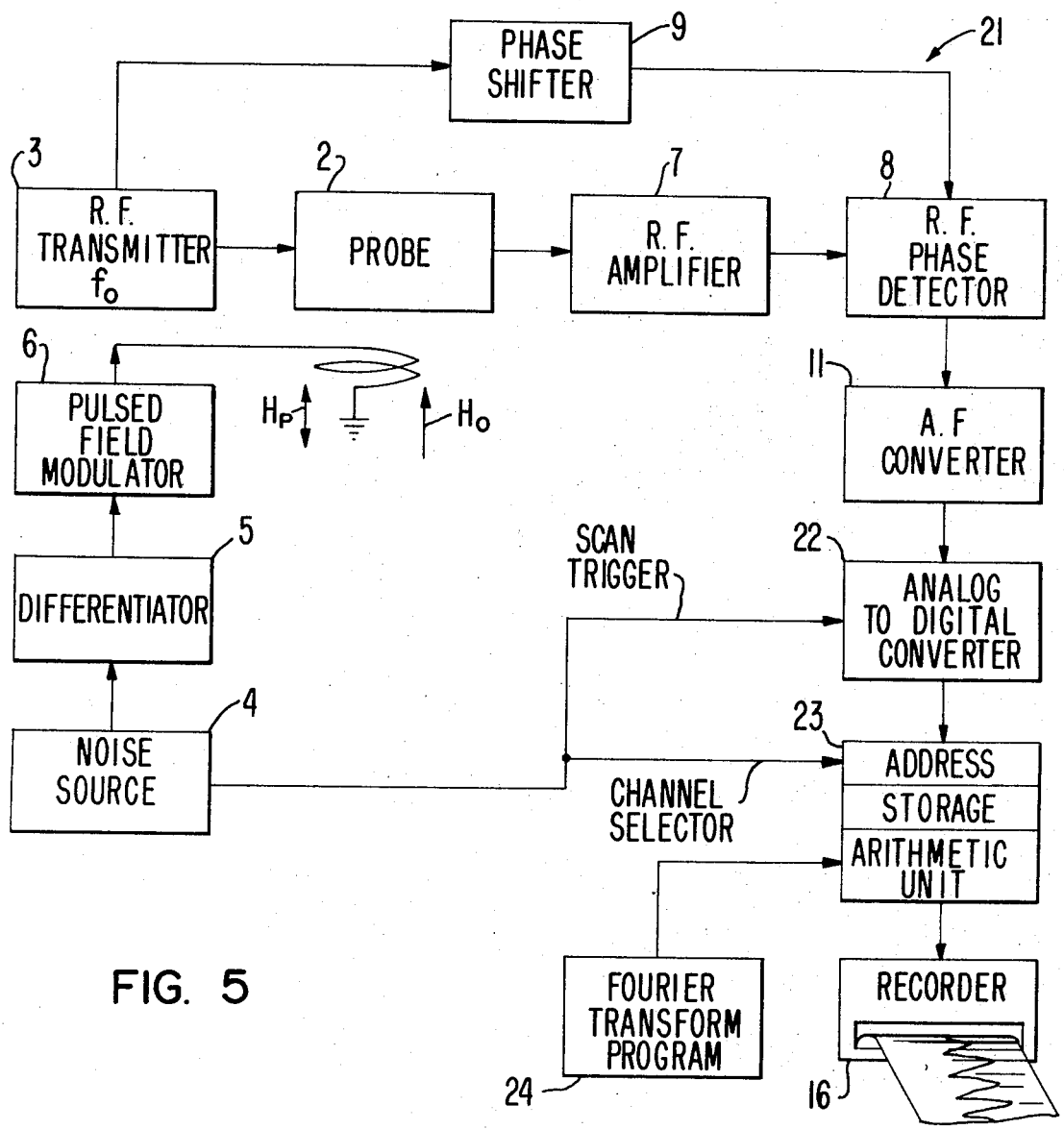
FIG. 5 is a schematic block diagram of an alternative spectrometer incorporating features of the present invention.

Referring now to FIG. 5, there is shown an alternative spectrometer 21 incorporating features of the present invention. Radio frequency spectrometer 21 is essentially the same as that of FIG. 1 with the exception that the output of the audio frequency amplifier 11 is fed to the input of an analog-to-digital converter 22 which performs a time scan on the composite resonance signal. The time scan is synchronized with each cycle of the pseudorandom binary sequence via a scan trigger signal derived from the sequence generator within the noise source 4. The composite resonance signal is sampled at periodic intervals synchronized with the basic step length $\tau$ of the binary sequence generator disposed within the noise source 4. Thus, if there are N basic steps in the pseudorandom sequence there are N sampling times for each cycle of the pseudorandom sequence. The analog-to-digital converter 22 converts the sampled amplitude of the composite resonace signal into digital data to be sequentially stored in respective channels of a memory of a computer 23, such as a Varian Data machine 620 I computer.

The computer 23 includes an address portion for addressing the sampled digital data to the respective storage channel. The address is synchronized with the basic bit rate of the pseudorandom sequence generator via a channel selector output, derived from the sequence generator within the noise source 4, and which is fed to the address. Thus, there is one scan of the composite resonance signal for each cycle of the pseudorandom sequence, such scan including a multitude of sampling points. The data derived from each sampling point is stored in a respective channel of the storage portion of the computer 23. The digital data derived from consecutive cycles of the pseudorandom sequence is accumulated in the respective channels of the storage for time averaging the composite resonance signal to obtain the signal to noise enhancement since the coherent signal components add in accordance with the number of sample bits, thereby obtaining substantial improvement in the signal to noise ratio.

After a relatively large number of cycles of the pseudorandom binary sequence, as of 500, the computer 23 reads out the data stored in each of the respective channels and performs a Fourier transform of the composite signal for converting the composite resonance signal in the time domain into its separate Fourier components in the frequency domain. The scan synchronization and the channel selector synchronization, as obtained from the pseudorandom binary sequence within the noise source 4 preserves the phase information for the separate Fourier components of the resonance signal. Each of these resonance components has a certain predetermined phase relation relative to the resonance exciting Fourier component of the transmitter signal. This predetermined phase relation can be precisely determined by a Fourier transformation of the particular pseudorandom binary sequence.

A Fourier transform program 24, which takes into account the precise nature of the pseudorandom sequence, is fed to the computer 23 for preserving the relative phase shifts of the various Fourier components readout of the computer 23 to the input of the recorder 16 to obtain a plot of the resonance spectrum of the sample under analysis. Pure absorption or pure dispersion mode resonance signals may be obtained by suitable changes in the Fourier transformer program or by selecting the correct phase shift for variable phase shifter 9.

A gyromagnetic resonance spectrometer employing a pseudorandom binary sequence for noise excitation of resonance and employing an analog-to-digital converter, computer and Fourier transform program synchronized by means of a scan trigger and channel selector is disclosed and claimed in copending U.S. application Ser. No. 847,859 filed Aug. 6, 1969 and assigned to the same assignee as the present invention.

Figure 6:
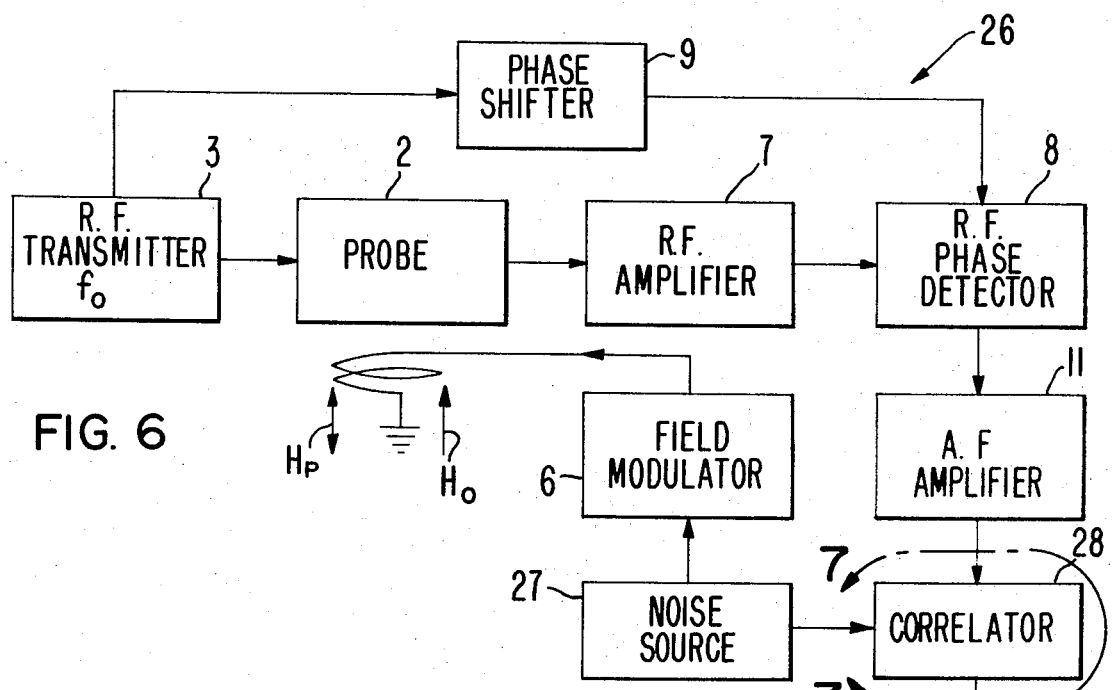
FIG. 6 is a schematic block diagram of an RF spectrometer incorporating features of the present invention.

Referring now to FIG. 6 there is shown an alternative radio frequency spectrometer 26 incorporating features of the present invention. Radio frequency spectrometer 26 is essentially the same as that previously described with regard to FIGS. 1 and 5 with the exception that the noise employed for noise modulation of the polarizing magnetic field $H_o$ is derived from a completely random noise source 27, such as a noise diode or Johnson noise source. The noise output from the noise source 27 is fed to a suitable amplifier, which preferably has higher gain at the high frequency end of its operating range, and thence is applied to the field modulator 6 for modulating the intensity of the polarizing magnetic field $H_o$ with the completely random noise field component $H_p$. The noise field modulation combines with the radio frequency transmitter signal at $f_o$, disposed at one end of the spectrum to be excited, to generate alternating magnetic fields within the sample under analysis having a power density spectrum similar to that depicted in FIG. 4 for exciting simultaneous resonance of the various resonance lines within the sample under analysis. A composite resonance signal emanating from the sample is picked up and fed to the radio frequency amplifier 7 and thence to RF phase detector 8 for detection with a sample of the transmitter signal $f_o$ to derive a composite audio frequency amplifier 11 and fed to one input of a correlator 28.

The correlator 28 correlates the exciting noise signal, as derived from the noise source 27, with the resultant noise resonance response of the sample under analysis to derive a cross-correlation function. The cross-correlation function is fed to the input of a Fourier transformer 29 where it is Fourier transformed to produce the separate Fourier resonance lines components of the sample under analysis which are then fed to the input of a recorder 31 for recording as a function of time or frequency to obtain the output resonance spectrum of the sample under analysis.

Figure 7:
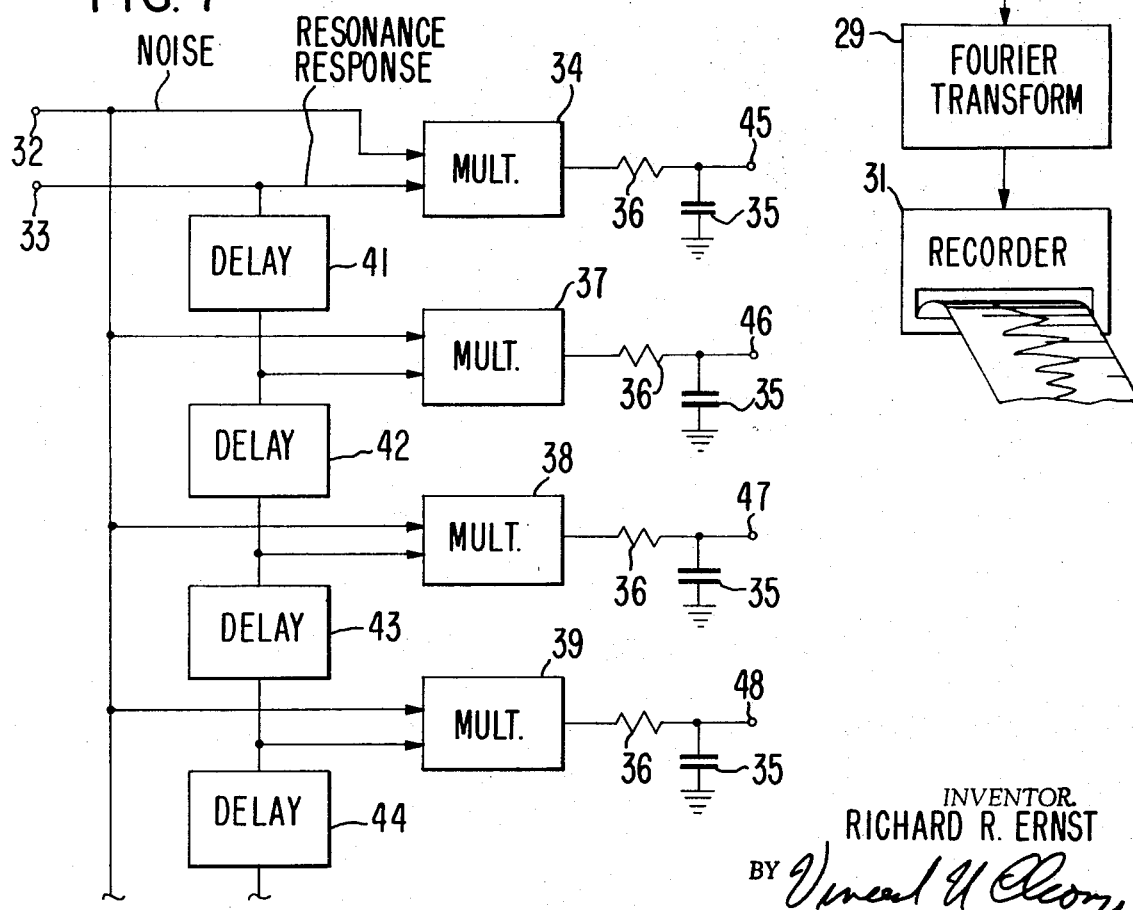
FIG. 7 is a schematic circuit diagram, partly in block diagram form, of a portion of the circuit of FIG. 6 delineated by line 7—7.

A suitable correlator 28 is shown in FIG. 7 and comprises an input terminal 32 to which the noise signal is applied and a second input terminal 33 to which the noise excited resonance response is applied. The two signals are then fed to the input of a first multiplier 34 wherein they are multiplied to derive a first output which is fed to a storage capacitor 35 for storage thereon. A series resistor 36 cooperates with the capacitor 35 to form the storage element. The noise output is similarly multiplied in successive multipliers 37, 38, and 39, etc. with successively additionally delayed samples of the noise resonance response as successively delayed by delays 41, 42, 43, 44, etc. to obtain successive outputs which are integrated and stored on storage capacitors 35 connected to the output of successive multipliers. The outputs derived from the output terminals 45, 46, 47, 48, etc. correspond to a time average of a composite cross-correlation function. After the composite resonance response has been sampled for a sufficiently long time, the cross-correlation output of the channels of the correlator 28 are Fourier transformed by Fourier transformer 29 to produce the Fourier resonance lines of the sample which are fed to recorder 31. The Fourier transformer 29 may be arranged to yield either the dispersion or the absorption mode resonance output or, as an alternative, the power output spectrum of the sample under analysis may be fed to the recorder 31 depending upon the method of analysis employed by the Fourier transformer 29. A suitable Fourier transformer is a Fourier transform computer, such as a Varian Data Machine 620 I computer as previously described with regard to FIG. 5.

The advantage of the magnetic field modulation of the present invention is that the receiver utilized to receive the resonance signals from the probe is not overloaded by direct coupling of radiofrequency energy from the transmitter to the receiver within the band of frequencies containing the resonance information. Thus, a suitable filter may be placed in the input of the radiofrequency amplifier 7 which excludes the direct coupling of the radio frequency transmitter signal $f_o$ into the radiofrequency amplifier 7.

Although the invention, as thus far described, has been described as it relates to exciting and detecting noise excited resonance of gyromagnetic resonance bodies, the invention is not limited to gyromagnetic resonance spectrometers but may also be employed at microwave frequencies and is applicable in general to microwave spectrometers, nuclear resonance spectrometers, electron spin spectrometers and nuclear quadruple resonance spectrometers.

Since many changes could be made in the above construction and many apparently widely different embodiments of this invention could be made without departing from the scope thereof, it is intended that all matter contained in the above description or shown in the accompanying drawings shall be intrepreted as illustrative and not in a limiting sense.

What is claimed is:

1. In a radiofrequency spectrometer, means for exciting radiofrequency resonance simultaneously of a plurality of resonance lines in a sample of matter under investigation immersed in a polarizing magnetic field, means for receiving a composite resonance signal emanating from the sample and containing the simultaneously excited plural resonance lines signals characteristic of the sample of matter under analysis, the improvement wherein said means for exciting radiofrequency resonance simultaneously of the plural resonance lines includes means for irradiating the sample with radiofrequency energy, and means for time varying the intensity of the polarizing magnetic field to produce a spectrum of alternating magnetic fields impinging upon the sample, said alternating magnetic fields having a bandwidth wide enough to cover the to be examined plural resonance lines of the sample, to excite simultaneous resonance of the plural resonance lines of the sample under analysis wherein said means for time varying the intensity of the polarizing magnetic field includes, means for modulating the intensity of the polarizing field with noise energy.

2. In a radiofrequency spectrometer, means for exciting radiofrequency resonance simultaneously of a plurality of resonance lines in a sample of matter under investigation immersed in a polarizing magnetic field, means for receiving a composite resonance signal emanating from the sample and containing the simultaneously excited plural resonance lines signals characteristic of the sample of matter under analysis, the improvement wherein, said means for exciting radiofrequency resonance simultaneously of the plural resonance lines includes means for irradiating the sample with radiofrequency energy, and means for time varying the intensity of the polarizing magnetic field to produce a spectrum of alternating magnetic fields impinging upon the sample, said alternating magnetic fields having a bandwidth wide enough to cover the to be examined plural resonance lines of the sample, to excite simultaneous resonance of the plural resonance lines of the sample under analysis wherein said means for time varying intensity of the polarizing magnetic field includes, means for pulse modulating the intensity of the polarizing magnetic field with a random or pseudorandom pulse sequence.

3. The apparatus of claim 2 wherein said pulses have an amplitude $H_p$ defined approximately by the relation:

$$\gamma \int_0^t H_p dt = \pi$$

where $\gamma$ is the gyromagnetic ratio for the sample, and $t$ is the pulse length, and where the pulse length $t$ is much shorter than the average period between pulses.

4. In a method of radiofrequency spectroscopy the steps of, immersing a sample under investigation in a polarizing magnetic field, irradiating the sample with radiofrequency energy, and time varying the intensity of the polarizing magnetic field in such a manner as to produce a spectrum of alternating magnetic fields to impinge upon the sample, said magnetic field having a bandwidth wide enough to cover the to be examined plural resonance lines of the sample to excite simultaneous resonance of the plural resonance lines of the sample under analysis wherein the step of time varying the intensity of the polarizing magnetic field includes the step of, modulating the intensity of the polarizing magnetic field with noise energy.

5. In a method of radiofrequency spectroscopy the steps of, immersing a sample under investigation in a polarizing magnetic field, irradiating the sample with radiofrequency energy, and time varying the intensity of the polarizing magnetic field in such a manner as to produce a spectrum of alternating magnetic fields to impinge upon the sample, said magnetic field having a bandwidth wide enough to cover the to be examined plural resonance lines of the sample to excite simultaneous resonance of the plural resonance lines of the sample under analysis wherein the step of time varying the intensity of the polarizing magnetic field includes the step of pulse modulating the intensity of the polarizing magnetic field with a random or pseudo random pulse sequence.

6. In a method of radiofrequency spectroscopy the steps of, immersing a sample under investigation in a polarizing magnetic field, irradiating the sample with radiofrequency energy, and time varying the intensity of the polarizing magnetic field in such a manner as to produce a spectrum of alternating magnetic fields to impinge upon the sample, said magnetic field having a bandwidth wide enough to cover the to be examined plural resonance lines of the sample to excite simultaneous resonance of the plural resonance lines of the sample under analysis wherein the step of time varying the intensity of a polarizing magnetic field includes the step of, pulse modulating the intensity of the polaring magnetic field with a pseudorandom pulse sequence wherein the pulses have an amplitude $H_p$ defined approximately by the relation:

$$\gamma \int_0^t H_p dt = \pi$$

where $\gamma$ is the gyromagnetic ratio for the sample, $t$ is the pulse length, and where the pulse length is much shorter than the average period between pulses.

* * * * *